United States Patent [19]

Lin

[11] Patent Number: 5,752,590

[45] Date of Patent: May 19, 1998

[54] RATCHET TOOL

[76] Inventor: Ching Chou Lin, No. 150, Sec. 3, Chung San Road, Wu Zh Hsiang, Taichung Hsien, Taiwan

[21] Appl. No.: 757,066

[22] Filed: Nov. 26, 1996

[51] Int. Cl.$^6$ .............................. B25B 15/04; F16D 41/08
[52] U.S. Cl. .............................. 192/44; 81/59.1; 81/63.1
[58] Field of Search ..................... 192/38, 44, 45; 81/59.1, 63.1

[56] References Cited

U.S. PATENT DOCUMENTS

| | | | |
|---|---|---|---|
| 1,904,621 | 4/1933 | Kounovsky | 192/44 X |
| 3,908,487 | 9/1975 | Plaw | 81/59.1 |
| 4,884,478 | 12/1989 | Lieser | 81/59.1 |
| 5,535,648 | 7/1996 | Braun et al. | 192/63.1 |

*Primary Examiner*—Richard M. Lorence
*Attorney, Agent, or Firm*—Charles E. Baxley, Esq.

[57] ABSTRACT

A ratchet tool includes a housing having a bole for rotatably receiving a rod and having one or more grooves for receiving supporting members and having a curved slot formed around the hole for receiving two rollers. The curved slot includes narrower ends or center portion for allowing the rollers to engage with the rod and the housing for allowing the housing to rotate the rod. The rod may be driven to rotate in one direction when only one of the rollers is engaged with the rod and the housing. The ratchet tool may be used for screw drivers or for wrenches.

5 Claims, 6 Drawing Sheets

RATCHET TOOL

BACKGROUND OF THE INVENTION

1. Field of the Invention

The present invention relates to a tool and more particularly to a ratchet tool.

2. Description of the Prior Art

Typical ratchet tools are disclosed in U.S. Pat. No. 1,904,621 to Kounovsky, U.S. Pat. No. 3,590,667 to Berglein, U.S. Pat. No. 4,873,898 to Chern, and U.S. Pat. No. 5,086,673 to Korty. The typical ratchet tools comprise an enlarged head formed on one end of a handle for rotatably receiving a cylindrical driving member, ant, a number of spaced balls or rollers engaged between the head and the driving member for controlling the rotational direction of the driving member. However, the balls and the rollers should be evenly spaced and engaged around the driving member for applying a uniform force against the driving member. In addition, the balls and the rollers should all be actuated simultaneously for controlling the driving member such that a number of depressions and springs and actuators are required for the balls or rollers respectively.

The present invention has arisen to mitigate and/or obviate the afore-described disadvantages of the conventional ratchet tools.

SUMMARY OF THE INVENTION

The primary objective of the present invention is to provide a ratchet tool in which only two rollers are required for controlling the driving member In accordance with one aspect of the invention, there is provided a ratchet too comprising a housing including a hole and including at least one groove and a curved slot formed around and communicating with the hole, a rod rotatably engaged in the hole of the housing, at least one first roller engaged in the groove for engaging with the rod and for rotatably supporting the rod in place, two second rollers engaged in the curved slot, means for biasing the second rollers to engage with the rod and the housing for allowing the housing to rotate the rod, and means for disengaging one of the second rollers from the rod and the housing for allowing the other second roller to engage with the rod and the housing.

The curved slot includes two ends having a size greater than that of the second rollers and includes a center portion having a size smaller than that of the second rollers for allowing the second rollers to be forced toward the center portion of the curved slot to engage with the rod and the housing by the biasing means.

A cover is rotatably engage in the housing and includes an extension extended into the center portion of the curved slot and engaged between the second rollers for moving the second rollers against the biasing means, and a moving means is provided for moving the cover relative to the housing.

The curved slot includes two ends having a size smaller than that of the second rollers and includes a center portion having a size greater than that of the second rollers for allowing the second rollers to be forced toward the ends of the curved slot to engage with the rod and the housing by the biasing means.

A cover is rotatably engaged in the housing and includes two extensions extended into the ends of the curved slot for moving the second rollers against the biasing means, and a moving means is provided for moving the cover relative to the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
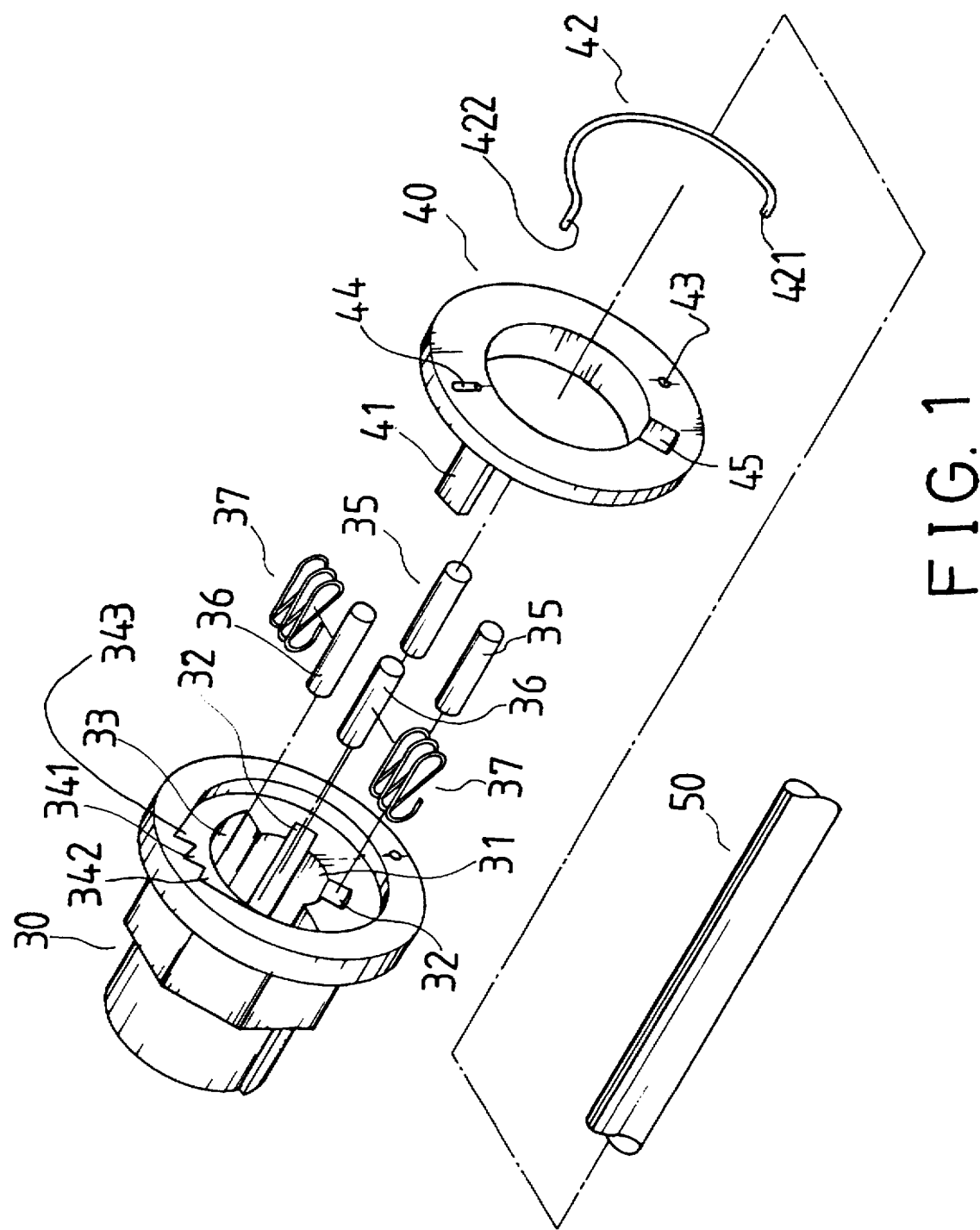
FIG. 1 is an exploded view of a ratchet tool in accordance with the present invention.

Referring to the drawings, and initially to FIGS. 1 to 5, a ratchet tool in accordance with the present invention comprises a housing 30 for engaging in a handle 10 of a screw driver or a trench. The housing 30 includes a hole 31 for rotatably engaging with a rod 50 and includes one or two grooves 32 and a curved slot 33 formed around and communicating with the hole 31. The housing 30 includes three depressions 341, 342, 343. Two rollers 35 are engaged in the grooves 32 for engaging with the rod 50 and for rotatably supporting the rod 50 in place. Two rollers 36 are engaged in the curved slot 33 and two springs 37 bias the rollers 36 toward the center portion of the curved slot 33. A cover 40 is rotatably engaged in the housing 30 and includes an extension 41 extended into the curved slot 33 and engaged between the two rollers 36. The extension 41 can be actuated to engage with and to move the rollers 36. The cover 40 includes two apertures 43, 44 for engaging with two ends 421, 422 of a spring 42 and includes a notch 45 for engaging with a key of a barrel 46 (FIG. 5) such that the cover 40 may be rotated by the barrel 46. One end 422 of the spring 42 may engage with either of the depressions 341–343 for positioning the cover 40 relative to the housing 30.

Figure 2:
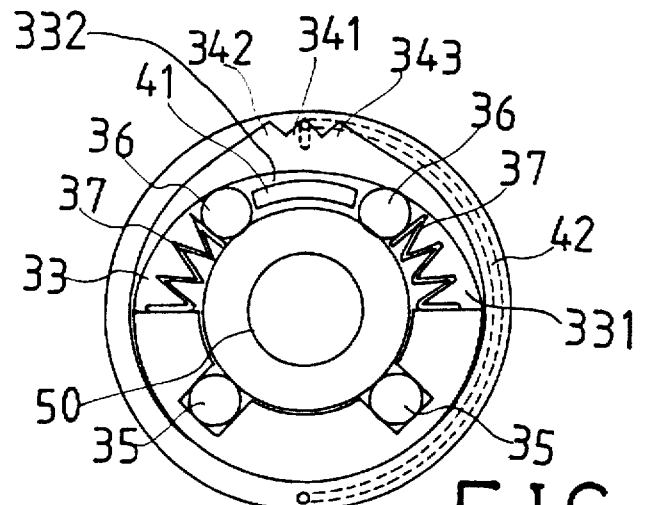
FIGS. 2, 3, 4 are schematic views illustrating the operation of the ratchet tool.
Figure 3:
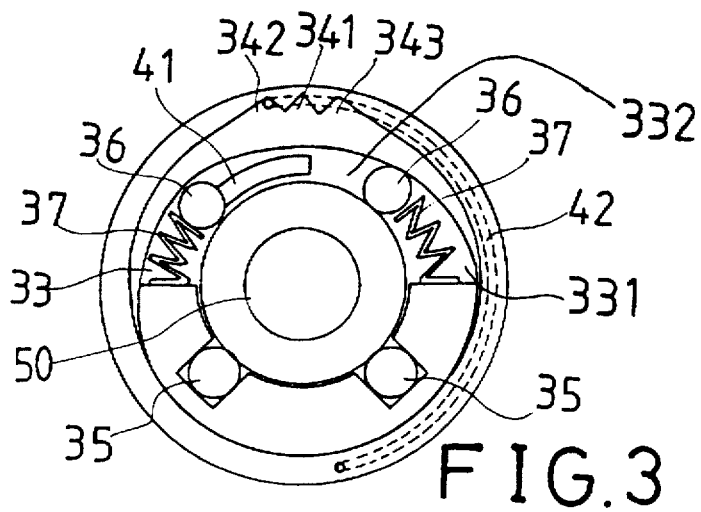
Figure 4:
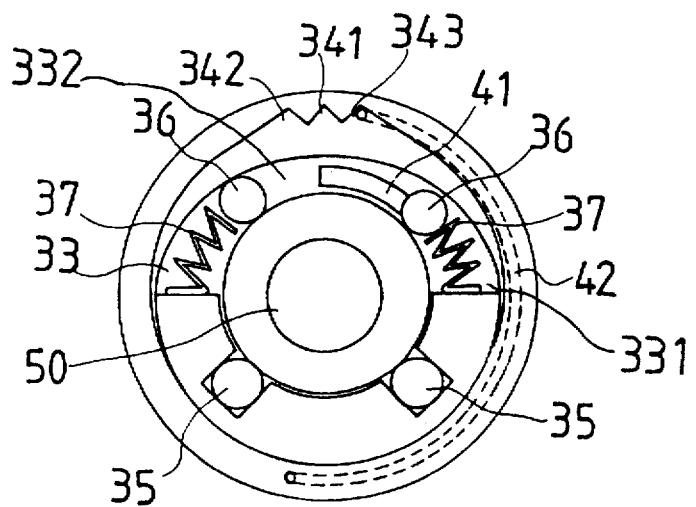
Figure 5:
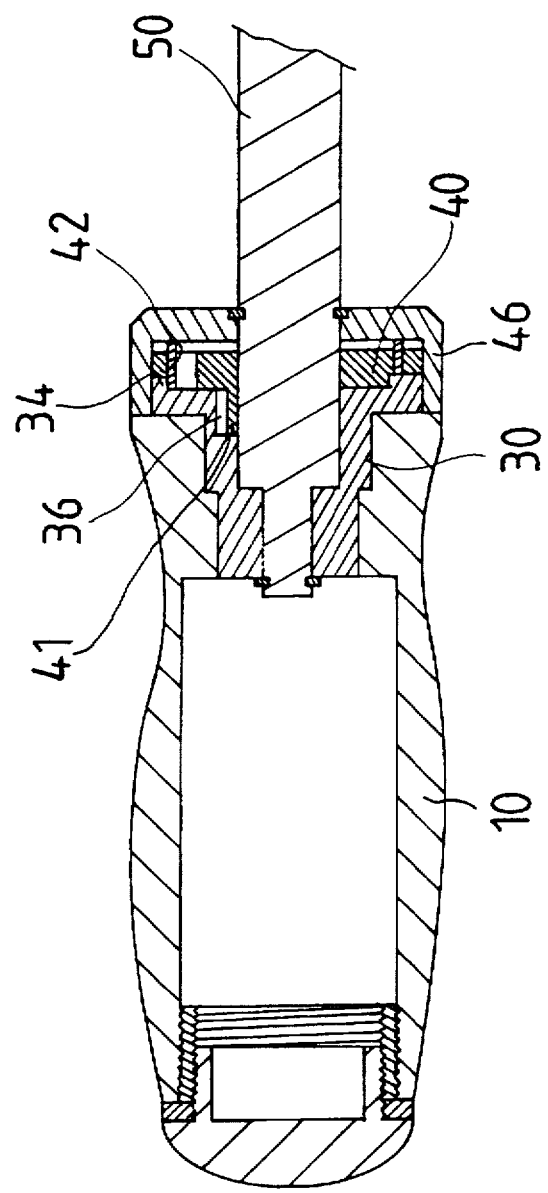
FIG. 5 is a schematic view illustrating the application of the ratchet tool.
Figure 6:
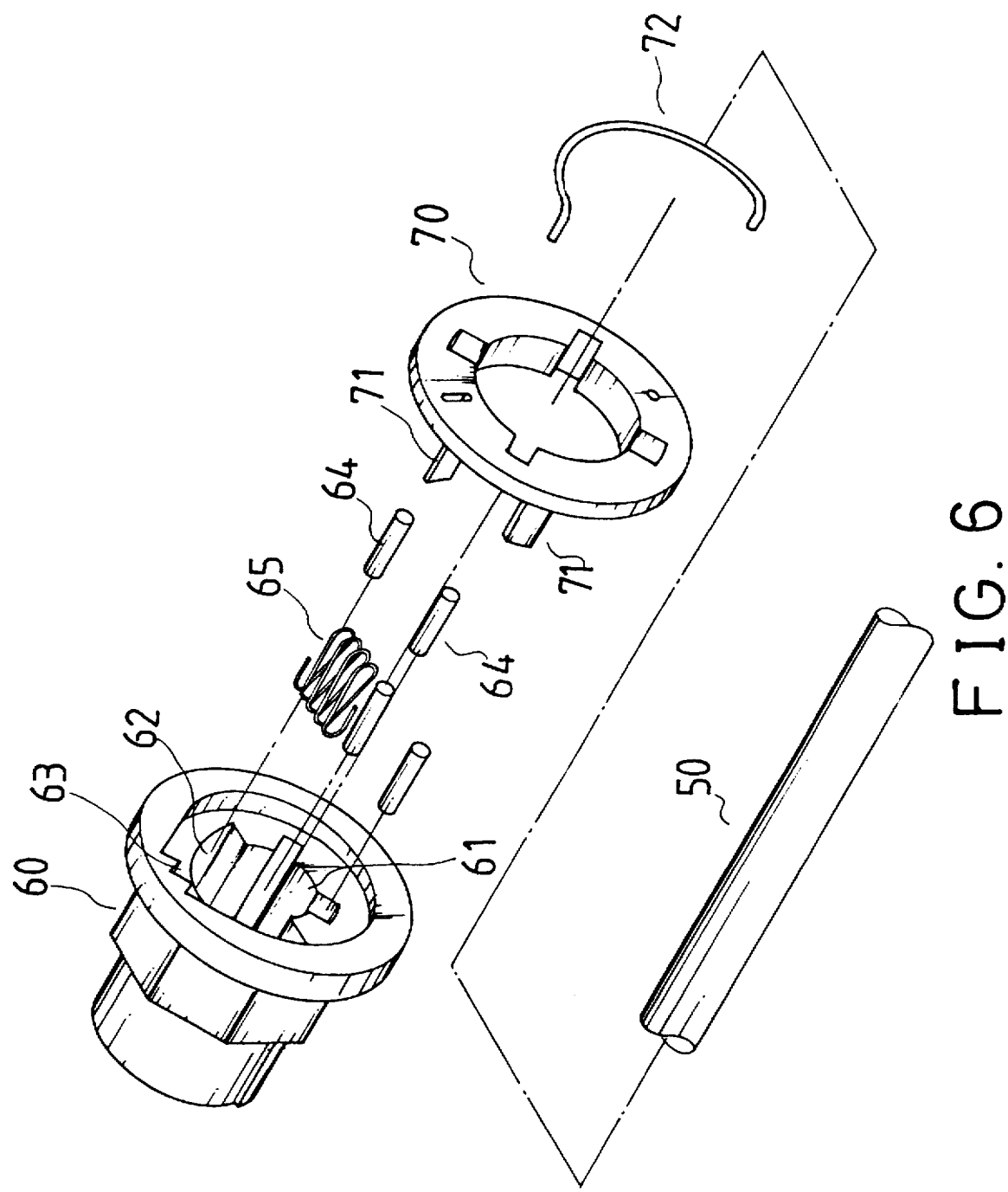
FIG. 6 is an exploded view of a ratchet tool illustrating another application of the invention.
Figure 7:
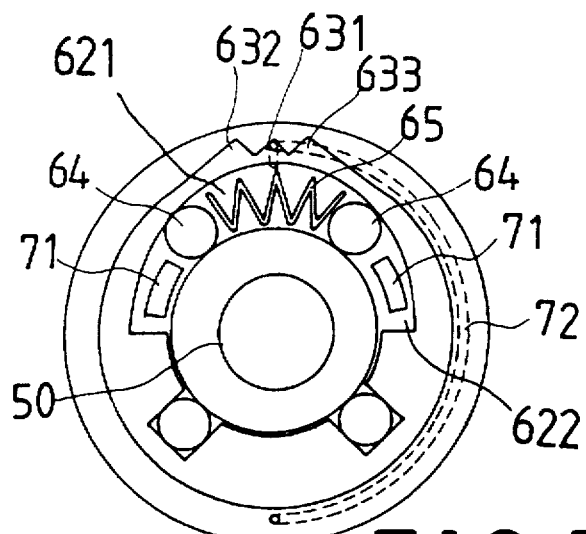
FIGS. 7, 8, 9 are schematic views illustrating the operation of the ratchet tool as shown in FIG. 6.
Figure 8:
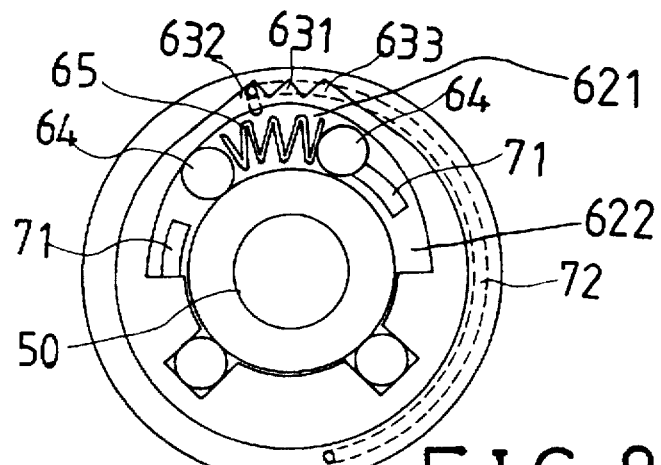
Figure 9:
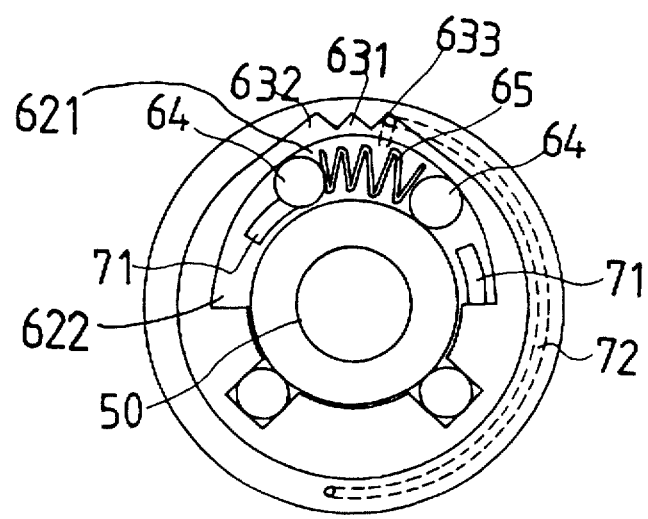

As best shown in FIGS. 2 to 4, the curved slot 33 includes two ends 331 having a size greater than the diameter of the roller 36 and includes the center portion 332 having a size smaller than the diameter of the roller 36 such that the rollers 36 may be forced to engage between the rod 50 and the housing 30 by the springs 37 (FIG. 2).

In operation, as shown in FIG. 2, when the end 492 of the spring 42 is engaged with the depression 341 and when the extension 41 is engaged centrally between the rollers 36, the rollers 36 may be biased to engage with the rod 50 and the housing 30 simultaneously such that the rod 50 may be rotated counterclockwise and clockwise by the housing 30 at this moment. As shown in FIG. 3, when the left roller 36 is moved away from the center portion of the curved slot 33, only the right roller 36 is forced to engage with the rod 50 and the housing 30 such that the rod 50 may be rotated counterclockwise by the housing 30 and such that the housing 30 may rotate clockwise relative to the rod 50 freely. As shown in FIG. 4, when the right roller 36 is moved away from the center portion of the curved slot 33, only the left roller 36 is forced to engage with the rod 50 and the housing 30 such that the rod 50 may be rotated clockwise by the housing 30 and such that the housing 30 may rotate counterclockwise relative to the rod 50 freely.

It is to be rioted that only the two rollers 36 are provided for controlling the driving direction of the rod 50. The rollers 35 are provided for rotatably engaging with and for rotatably supporting the rod 50 in place only. In addition, only one extension 41 is required for engaging with and for actuating the rollers 36.

Alternatively, as shown in FIGS. 6–9, the housing 60 also includes a hole 61 for receiving the rod 50 and includes a curved slot 62 for engaging with two rollers 64 and a spring 65 which is engaged between the rollers 64. The cover 70 includes two (extensions 71 engaged into the ends of the curved slot 62 for engaging with the rollers 64. The spring 72 may also engage with the depressions 631, 632, 633 for positioning the cover 70 relative to the housing 60. The curved slot 62 includes a central portion 621 having a size greater than that of the roller 64 and includes two end portions 622 having a size less than that of the roller 64. The spring 65 may bias the rollers 64 to engage with the rod 50 and the housing 60, and the extensions 71 may move either of the rollers 64 toward the center portion for controlling the driving direction of the rod 50.

Figure 10:
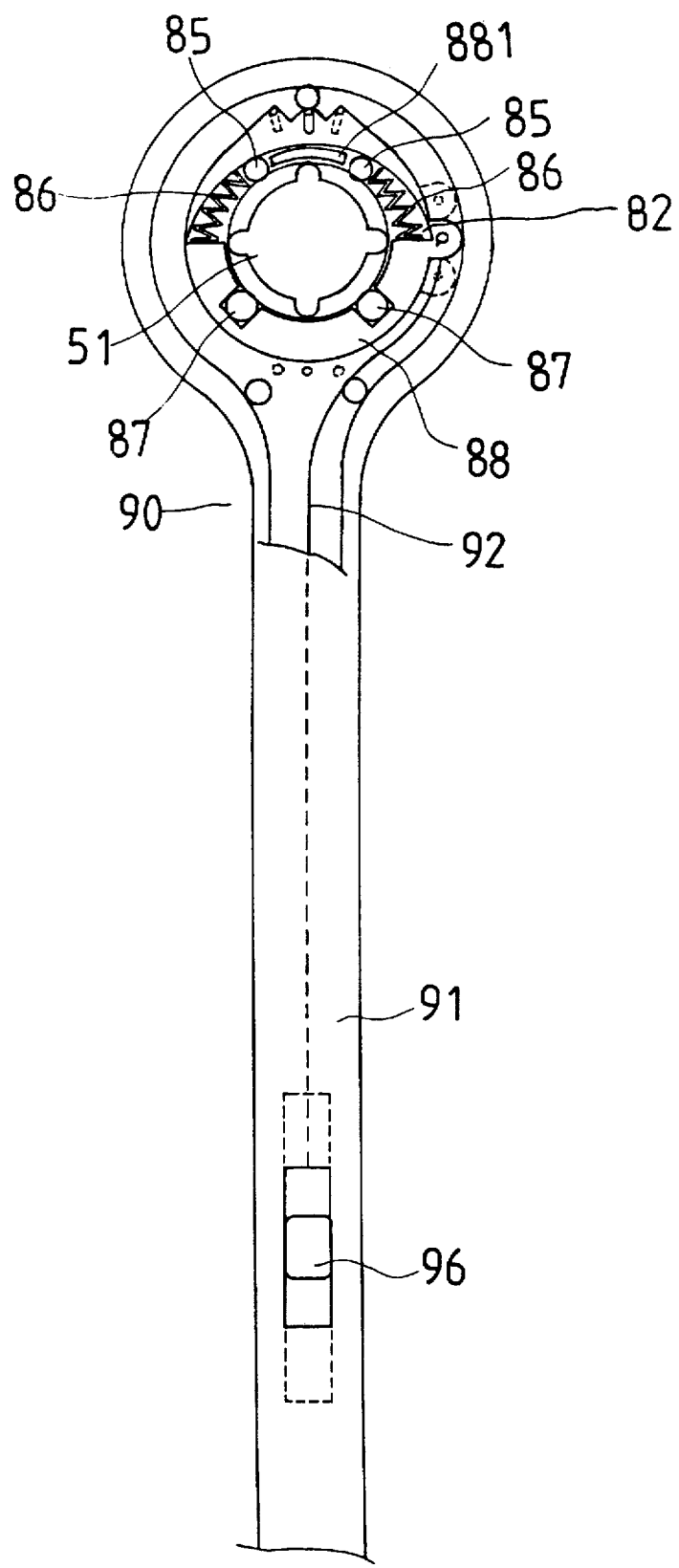
FIG. 10 is a schematic view illustrating the other application of the ratchet tool.

Referring next to FIG. 10, the housing 80 may be the enlarged head formed on one end of a handle 91 of a wrench 90. The housing 80 also includes two channels for receiving two rollers 87 which may rotatably support the driving member 51 in place, and includes a curved slot 82 for engaging with two rollers 85 and two springs 86. An extension 881 of a cover 88 may move the rollers 85 away from the central portion of the slot 82 against the spring 86. A wire 92 may be used for rotating the cover 88 by a knob 96 which will be filed in a co-pending application and which will not be described in further details.

Accordingly, the ratchet tool in accordance with the present invention includes two rollers for controlling the driving member and one or more rollers for rotatably supporting the rod in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A ratchet tool comprising:

a housing including a hole and including at least one groove and a curved slot formed around and communicating with said hole, a rod rotatable engaged in said hole of said housing, at least one first roller engaged in said groove for engaging with said rod and for rotatably supporting said rod in place, two second rollers engaged in said curved slot, means for biasing said second rollers to engage with said rod and said housing for allowing said housing to rotate said rod, and means for disengaging one of said second rollers from said rod and said housing for allowing the other second roller to engage with said rod and said housing.

2. A ratchet tool according to claim 1, wherein said curved slot includes two ends having a size greater than that of said second rollers and includes a center portion having a size smaller than that of said second rollers for allowing said second rollers to be forced toward said center portion of said curved slot to engage with said rod and said housing by said biasing means.

3. A ratchet tool according to claim 2 further comprising a cover rotatably engaged in said housing and including an extension extended into said center portion of said curved slot and engaged between said second rollers for moving said second rollers against said biasing means, and means for moving said cover relative to said housing.

4. A ratchet tool according to claim 1, wherein said curved slot includes two ends having a size smaller than that of said second rollers and includes a center portion having a size greater than that of said second rollers for allowing said second rollers to be forced toward said ends of said curved slot to engage with said rod and said housing by said biasing means.

5. A ratchet tool according to claim 4 further comprising a cover rotatably engaged in said housing and including two extensions extended into said ends of said curved slot for moving said second rollers against said biasing means, and means for moving said cover relative to said housing.

* * * * *